United States Patent [19]

De Filippo

[11] Patent Number: 5,433,503
[45] Date of Patent: Jul. 18, 1995

[54] ARMREST FOR MOTOR-VEHICLE REAR SEATS

[75] Inventor: Emilio De Filippo, Bruzolo, Italy

[73] Assignee: Gestind-M.B. "Manifattura Di Bruzolo" S.p.A., Bruzolo, Italy

[21] Appl. No.: 170,860

[22] Filed: Dec. 21, 1993

[30] Foreign Application Priority Data

Dec. 21, 1992 [IT] Italy .............. TO92A01026

[51] Int. Cl.⁶ .............................................. A47C 13/00
[52] U.S. Cl. .................................. 297/115; 297/113; 297/408; 297/410
[58] Field of Search .............. 297/112, 113, 115, 391, 297/408, 410, 411.2, 411.26, 411.32, 411.35, 411.38

[56] References Cited

U.S. PATENT DOCUMENTS

| 1,896,477 | 2/1933 | Boller . |
| 3,254,915 | 6/1966 | Mahaffey .................. 297/113 X |
| 3,343,875 | 9/1967 | Ferrara . |
| 3,374,032 | 3/1968 | Del Giudice ............ 297/411.32 X |
| 4,176,878 | 12/1979 | Koufsky ..................... 297/115 |
| 4,533,175 | 8/1985 | Brennan ................. 297/411.32 X |
| 5,096,256 | 3/1992 | Mouri ........................ 297/113 |

FOREIGN PATENT DOCUMENTS

| 0571097 | 11/1983 | European Pat. Off. . |
| 4015872 | 1/1992 | Germany . |
| 4225880 | 2/1993 | Germany . |
| 63-038046 | 2/1988 | Japan ...................... 297/411.38 |
| 1229947 | 4/1971 | United Kingdom . |

OTHER PUBLICATIONS

Patent Abstracts of Japan, vol. 11, No. 356, Nov. 1987, Nippon Soken Inc.

Primary Examiner—Kenneth J. Dorner
Assistant Examiner—Milton Nelson, Jr.
Attorney, Agent, or Firm—Sughrue, Mion, Zinn, Macpeak & Seas

[57] ABSTRACT

A central armrest for a motor-vehicle rear seat, comprising an elongated body provided at one end with a mounting structure for a transverse pivot pin supported by two back rest elements spaced apart from each other so as to define a central recess. The armrest is provided at the other end thereof with a headrest member which is integrally formed with the elongated body and is displaceable therewith, relative to the mounting structure of the pivot pin, between a proximal condition and a distal condition.

7 Claims, 4 Drawing Sheets

ARMREST FOR MOTOR-VEHICLE REAR SEATS

BACKGROUND OF THE INVENTION

The present invention refers in general to armrests for motor-vehicle seats, and is related in particular to a central armrest for a rear seat assembly having a seat cushion element and two back rest portions provided with respective top headrests and spaced-apart from each other so as to define an intermediate recess for the armrest.

From DE-C-40 15 872 a central armrest for a rear seat assembly is known, comprising an elongated body having one end provided with a mounting structure with a transverse pivot pin, which is intended to be supported by the two back rest portions in proximity to the seat cushion element so as to allow swinging of the armrest between a substantially horizontal lowered position and a substantially vertical raised position, and an opposite end having a headrest element, which is adapted to be used in said raised position of the armrest.

In this known construction the headrest element is formed by a cushion which is separated and distinct from the elongated body of the armrest and is slidably mounted, parallel to the longitudinal axis thereof and by means of a telescopic structure, between a retracted position and an advanced position. When the armrest is in the raised position, displacement of the cushion from the retracted position to the advanced position (i.e. raising thereof) results in providing a central headrest situated at the same height of the two headrests carried by the top ends of the two back rest portions.

The two-part structure of this known central armrest has a complex construction, in particular due to the presence of the telescopic structure incorporated within the elongated body of the armrest for the sliding motion of the headrest element.

From DE-A-42 25 880 a central armrest for a motor vehicle rear seat assembly is also known, which is swingable between a lowered and a raised position and carries at the free end thereof a headrest element which can be used in the raised position of the armrest. Even in this case the headrest is formed by a body distinct from the armrest, but the vertical position thereof in the raised position of the armrest can not be modified.

SUMMARY OF THE INVENTION

The object of the present invention is to overcome the drawbacks of the above mentioned known armrests and to provide a central armrest having a headrest element whose height, in the raised position of the armrest, can be adjusted by means of a construction adapted to be manufactured in a more simple and economical way.

A further object of the invention is to provide a central armrest which, in the raised position of use of the headrest element, is adapted to enable higher safety and comfort for the user, accomplishing at the same time an additional effect of modifying the configuration of the rear seat assembly onto which same is applied in use, specifically consisting of increasing the rear loading capacity of the vehicle (in particular of sedan or station-wagon cars), and further allowing easy anchoring of a baby-seat or the like in the area of the central armrest.

According to the invention, these objects are achieved by virtue of a central armrest of the above-referenced type, the main feature of which resides in that the headrest element is formed in one piece with the elongated body of the armrest, and in that in said raised position the elongated body can be translated as a whole, relative to the mounting structure of the pivot pin, between a proximal condition and a distal condition corresponding to a minimum and, respectively, a maximum height of the headrest element.

BRIEF DESCRIPTION OF THE DRAWINGS

Additional features of the invention will become apparent in the following detailed description, referring to the annexed drawings purely provided by way of non-limiting example, wherein.

DETAILED DESCRIPTION OF THE INVENTION

Figure 1:
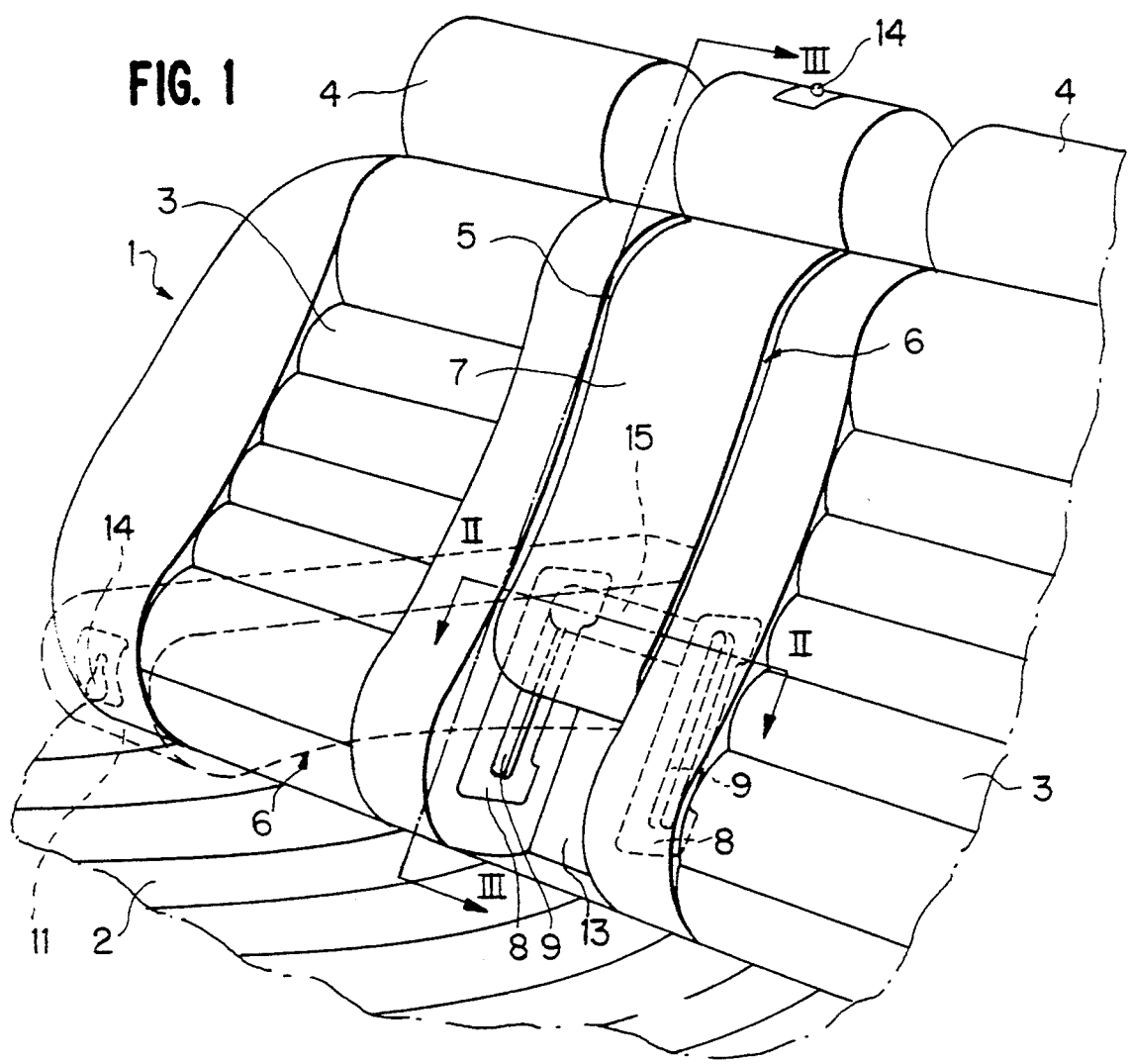
FIG. 1 is diagrammatic perspective view of a central armrest according to the invention applied on a motor-vehicle rear seat assembly.

In the drawings, reference numeral 1 generally designates a rear seat assembly of a motor-vehicle, comprising in a generally conventional way a seat cushion element 2 and two back rest portions 3 carrying at the top thereof respective headrests 4.

The two back rest portions 3 are spaced-apart from each other so as to define a substantially vertical central recess 5, delimited inferiorly by the cushion element 2 and open upwardly, in correspondence of which a central armrest generally designated as 6 is positioned.

The central armrest 6 is constituted by a single elongated body 7, normally made of foamed-plastic material incorporating in a way known per se a stiffening frame, provided at one end with a mounting structure for connection thereof to the sides of the back rest portions 3 facing towards the recess 5.

This mounting structure is essentially constituted by a pair of lateral connecting plates 8 formed with respective substantially vertical slots 9 along which the ends of a transverse horizontal pin 10, on which the armrest 6 is swingably supported, are slidably fitted.

The other end of the elongated body 7 is shaped as a headrest 11, formed integrally with and thus fixed relative to the body 7.

Figure 3:
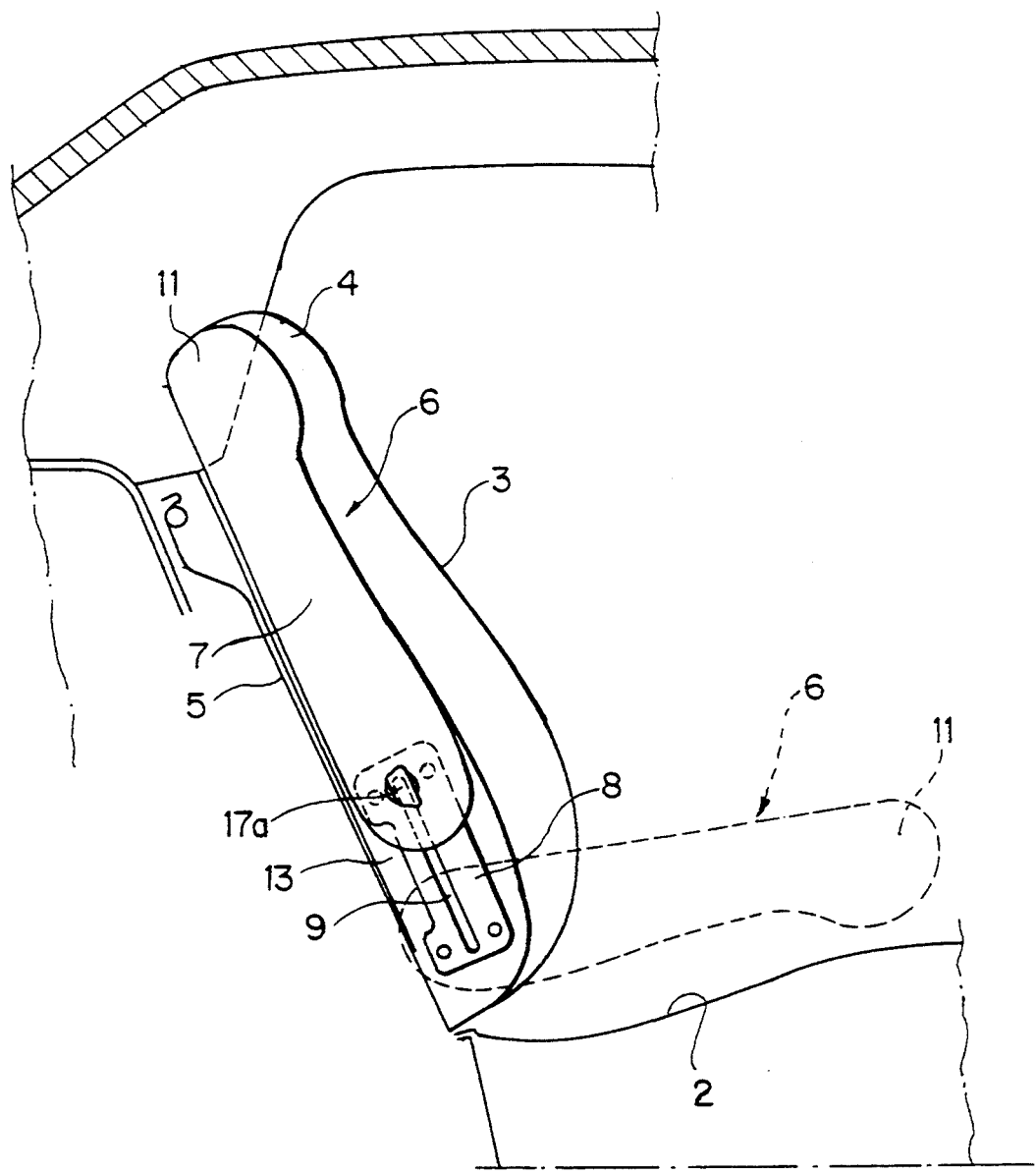
FIG. 3 is a partially sectioned view along line III—III of FIG. 1.

With the above disclosed configuration, in the mounted condition of the two plates 8 the armrest 6 can swing around the axis of the pivot pin 10 between substantially horizontal lowered position, shown in dotted line in FIGS. 1 and 3 and wherein it is extending above the seat cushion element 2 thus enabling arm resting for the passengers seated in correspondence of the back rest portions 3, and a substantially vertical raised position, shown in unbroken line in FIGS. 1 and 3, wherein the armrest 6 is housed within the recess 5. A locking device, known per se and not shown in detail in the drawings, which can be released by means of a tie rod mechanism 14 (FIG. 1), is provided for stopping the armrest 6 in either one of said lowered and raised positions so as to prevent undesired rotation thereof relative to the pivot pin 10.

In the lowered position, the pivot pin 10 is substantially positioned in correspondence of the lower portions of the slots 9 of the two plates 8, with the rear end of the elongated body 7 resting upon the cushion element 2 or upon an intermediate element not shown in the drawings.

In the raised position, the armrest 6 can be displaced substantially vertically as a whole, through sliding of the ends of the pivot pin 10 along the slots 9 of the two plates 8, between a proximal condition in which it is adjacent to the cushion element 2 and the headrest element 11 is lowered with respect to the two headrests 4, and a distal position (shown with unbroken line in FIGS. 1 and 3) in which the headrest element 11 is situated substantially at the same level of the two headrests 4. In both conditions (and possibly also in any intermediate condition) the elongated body 7 acts as a continuous and uninterrupted back rest for a central passenger, and the headrest element 11 can evidently be used as an adjustable headrest for such a passenger.

The mounting structure (plates 8 and pivot pin 10) is conveniently provided with a disengageable locking device for maintaining in the raised position the elongated body 7 in either one of the proximal distal conditions, as will be disclosed herebelow.

Figure 4:
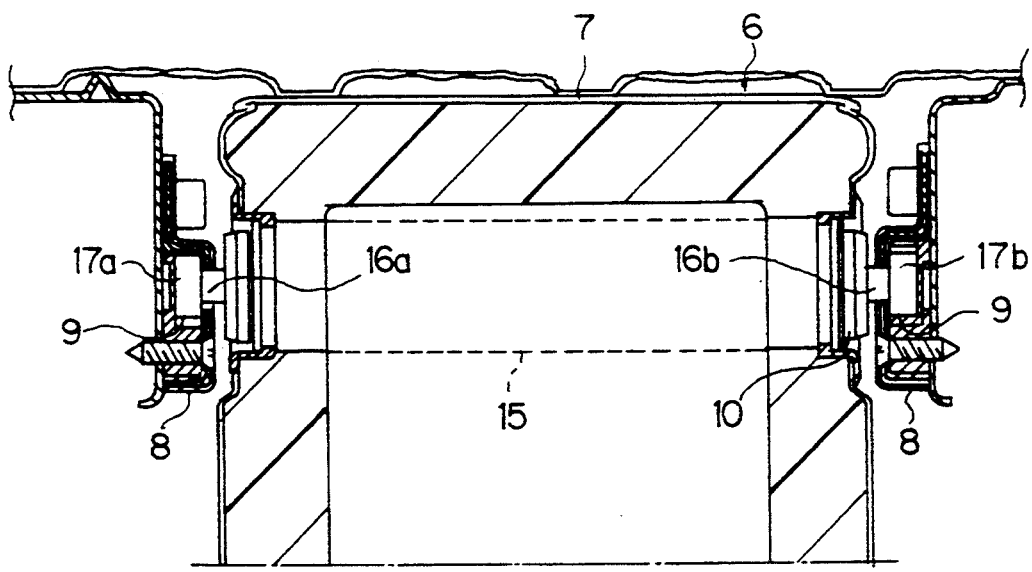
FIG. 4 is a partially sectioned view along line IV—IV of FIG. 2, and FIGS. 5 and 6 are two sectioned and enlarged views taken along line V—V and VI—VI, respectively, of FIG. 2.
Figure 2:
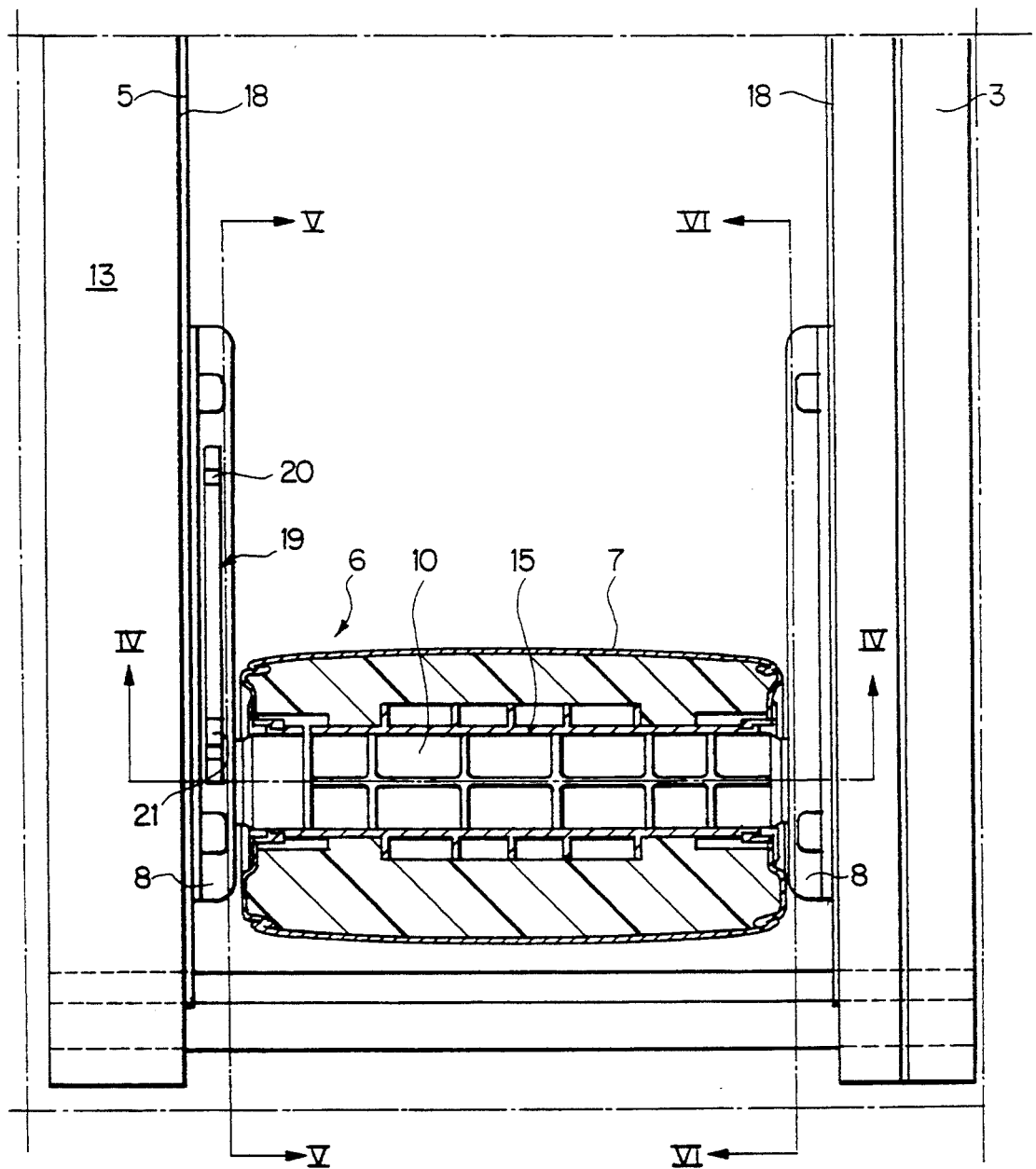
FIG. 2 is a front elevational, partially sectioned and enlarged view along line II—II of FIG. 1.

In the distal condition, a through opening 13 is defined across the recess 5, between the cushion element 2, the sides of the back rest portions 3 and the lower end of the armrest 6, and along which, in the absence of a central passenger, any elongated article (for instance skies and the like) within the rear baggage compartment of the car, may be fitted. Moreover, the passage 13 also enables firm and safe anchoring, by means of suitable quick connections not shown, of a baby seat. Referring now in detail to FIGS. 2 and 4, the pivot pin 10 extends through a tubular transverse portion 15 of the stiffening frame incorporated within the body 7 of the armrest 6 and has its opposite ends, projecting from the sides of the body 7, each formed by a reduced-section part 16a, 16b and by a terminal sliding block 17a, 17b, respectively. Both the reduced portions 16a, 16b and the terminal sliding blocks 17a, 17b have a substantially quadrangular cross-section, so as to prevent rotation of the pivot pin 10.

Each of the two sliding blocks 17a, 17b is slidably mounted along the slot 9 of the corresponding plate 8, and these plates 8 are secured, for instance by means of screws, to the corresponding sides of the bearing structures 18 of the two back rest portions 3.

Figure 5:
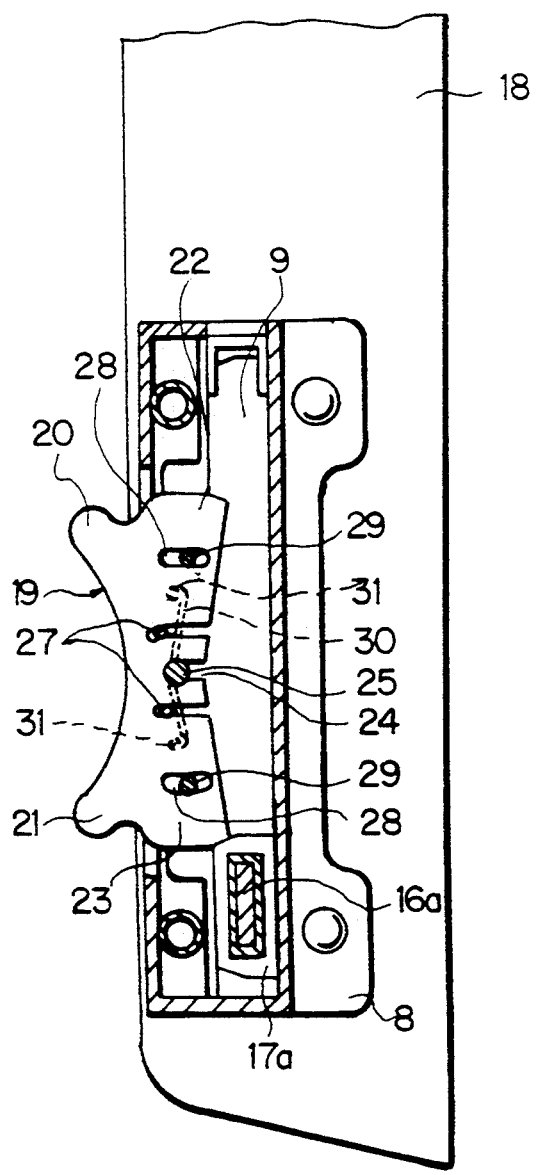
Figure 6:
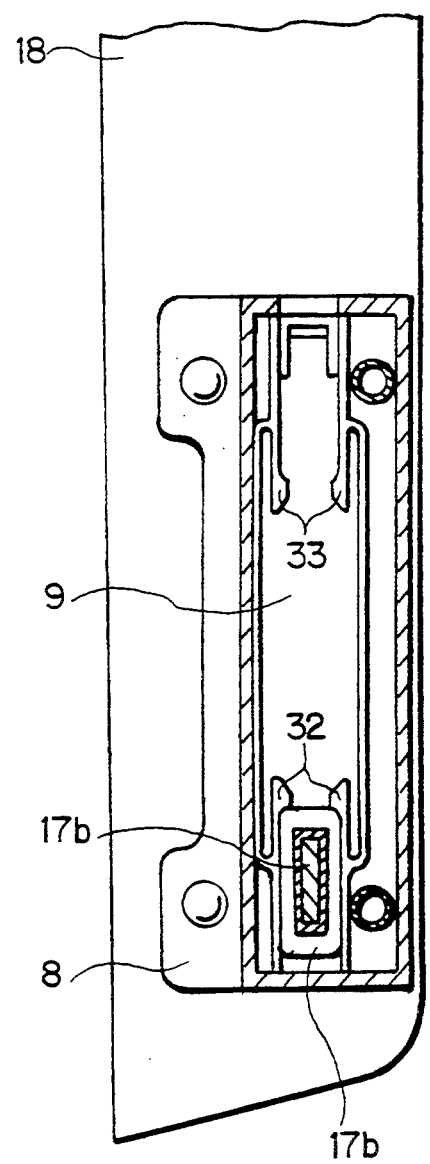

Referring in more detail to FIG. 5 and 6, the plate 8 slidably carrying the terminal sliding block 17a is provided with a locking push button 19 formed by a shaped plate defining on a front side thereof upper and lower projections 20, 21 and on a rear side thereof upper and lower heel members 22, 23. In its rear area, the plate 19 is formed with an open central slit 24 across which a transverse pivot pin 25 fixed to the plate 8 is fitted, with two intermediate open slits 26 placed on opposite sides with respect to the central slit 24 and across which respective transverse pins 27, also carried by the plate 8 are fitted, and with two outer closed slots 28 across which respective transverse pins 29 also carried by the plate 8 are fitted.

A two-arm wire spring 30, wound on the central pivot pin 25, bears on the pins 27 and reacts against a pair of projections 31 adjacent thereto, fixed to the plate 19.

The slot 9 of the other plate 8, i.e. the one along which the other sliding block 17b is slidable, is provided at its opposite ends with a pair of resilient lower and upper end formations 32 and 33 for snap-engaging the slide block 17b.

FIGS. 5 and 6 show the position of the terminal sliding blocks 17a, 17b in the proximal condition of the body 7 of the armrest 6. In this position the sliding blocks 17a and 17b are positioned at the lower ends of the respective slots 9, with the sliding block 17a locked by the lower heel stop 23 of the plate 19, and the sliding block 17b held within the lower formation 32.

In order to displace the armrest 6 towards the distal condition, it is necessary to actuate the locking plate 19, pushing the upper projection 20 thereof, so as to cause rotation thereof around the central pin 25 and thus shifting forwardly the lower heel stop 23 with respect to the top of the sliding block 17a.

Following this operation, which can be conveniently performed with one hand of the user, it is sufficient to pull the body 7 upwardly with the same hand, thus disengaging the sliding block 17b from the formation 32 and enabling then upwardly sliding of the two sliding blocks 17a and 17b along the respective slots 9. Sliding of the block 17a is evidently allowed by the angular displacement initially in one direction, and subsequently in the opposite direction of the locking plate 19, operated by the sliding block 17a itself.

When the distal condition is reached, the upper heel stop 22 snap-engages below the sliding block 17a, while the other sliding block 17b snap fits within the upper formation 33.

In order to displace again the body 7 into the proximal condition, the lower projection 21 of the locking block 19 has simply to be pushed and the body 7, is then pushed downwardly, until reaching the starting position shown in FIGS. 5 and 6.

Naturally the conformation of the locking plate 9 may be different from the illustrated one, and can for instance be designed so as to allow positioning of the body 7 also in one intermediate position comprised between the proximal and distal conditions, or even allow a step-adjustment of the height thereof.

What I claim is:

1. A central armrest for a motor-vehicle rear seat assembly, having a seat cushion element and two back rest portions provided with respective top headrests and spaced-apart from each other so as to define an intermediate recess for the armrest, said armrest comprising an elongated body having one end provided having a mounting structure with a transverse pivot pin which is intended to be supported by the two back rest portions in proximity to the seat cushion element, so as to allow oscillation of the armrest between a substantially horizontal lowered position and a substantially vertical raised position, and an opposite end having a headrest element which can be used in the raised position of the armrest, wherein the headrest element is formed in one piece with the elongated body of the armrest and wherein in the raised position said elongated body is displaceable as a whole, relative to the mounting structure between a proximal condition and a distal condition corresponding to a minimum and respectively, a maximum height of the headrest element.

2. Armrest according to claim 1, further comprising a disengageable locking device for maintaining the elongated body in either one of said proximal and distal conditions.

3. Armrest according to claim 2, wherein:
the pivot pin is provided at its opposite ends with respective sliding blocks projecting from the body of the armrest,
the mounting structure comprises a pair of plates adapted to be supported by the two back-rest portions on opposite sides relative to said intermediate recess and having respective longitudinal slots,
the disengageable locking device comprises a resiliently swingable member carried by one of the two plates and formed with two stop members projecting within the respective longitudinal slot and snap-lock co-operating with the corresponding sliding block of the pivot pin in said proximal and distal conditions, and a pair of resilient end formations dissposed in opposite ends of the slot of the other plate, so as to snap-engage the other sliding block of the pivot pin in said proximal and distal conditions.

4. A motor-vehicle rear seat assembly, comprising a seat cushion element and two back rest portions provided with respective top headrests and spaced-apart from each other so as to define an intermediate recess, and an armrest placed in said intermediate recess and comprising an elongated body having one end provided with a mounting structure with a transverse pivot pin, which is supported by said two back rest portions in proximity to the seat cushion element, said armrest being rotatable between a lowered position in which it extends horizontally above the seat cushion element, and a raised condition in which it is contained substantially vertically within said central recess, and wherein said armrest is provided at the opposite end thereof with a headrest element which, in the raised condition of the armrest, is adapted to be placed between the two headrests of the two back rest portions, wherein the headrest element is formed in one piece with the elongated body of the armrest and wherein said elongated body in the raised position is displaceable as a whole, relative to the mounting structure between a proximal condition in which said headrest element is lowered with respect to the headrests of the two back rest portions, and a distal condition in which said headrest element is substantially placed at the same level of said headrests.

5. Seat assembly according to claim 4, wherein a through opening is defined across said recess in the raised position and in the distal condition of the armrest, between the seat cushion element and said armrest.

6. Seat assembly according to claim 4, further comprising a disengageable locking device for maintaining the elongated body of the central armrest in either one of said proximal and distal conditions.

7. Seat assembly according to claim 6, wherein:
the pivot pin is provided at its opposite ends with respective sliding blocks projecting from the body of the armrest,
the mounting structure comprises a pair of plates supported by the two back-rest portions on opposite sides relative to said intermediate recess and having respective longitudinal slots,
the disengageable locking device comprises a resiliently swingable member carried by one of the two plates and formed with two stop members projecting within the respective longitudinal slot and snap-lock co-operating with the corresponding sliding block of the pivot pin in said proximal and distal conditions, and a pair of resilient end formations disposed in opposite ends of the slot of the other plate, so as to snap-engage the other sliding block of the pivot pin in said proximal and distal conditions.

* * * * *